(12) United States Patent
Matsuo et al.

(10) Patent No.: US 9,347,553 B2
(45) Date of Patent: May 24, 2016

(54) CONTROL DEVICE OF AUTOMATIC TRANSMISSION AND METHOD OF CONTROLLING AUTOMATIC TRANSMISSION

(71) Applicant: NISSAN MOTOR CO., LTD., Yokohama-shi, Kanagawa (JP)

(72) Inventors: Katsuhiro Matsuo, Kanagawa (JP); Masami Suzuki, Shizuoka (JP); Hiroki Matsui, Kanagawa (JP)

(73) Assignee: NISSAN MOTOR CO., LTD., Yokohama-shi, Kanagawa (JP)

(*) Notice: Subject to any disclaimer, the term of this patent is extended or adjusted under 35 U.S.C. 154(b) by 0 days.

(21) Appl. No.: 14/423,148

(22) PCT Filed: Jul. 8, 2013

(86) PCT No.: PCT/JP2013/068630
§ 371 (c)(1),
(2) Date: Feb. 23, 2015

(87) PCT Pub. No.: WO2014/034280
PCT Pub. Date: Mar. 6, 2014

(65) Prior Publication Data
US 2015/0226322 A1 Aug. 13, 2015

(30) Foreign Application Priority Data

Aug. 31, 2012 (JP) .................... 2012-191536

(51) Int. Cl.
| | | |
|---|---|---|
| G06F 17/00 | (2006.01) |
| F16H 61/12 | (2010.01) |
| F16H 61/02 | (2006.01) |
| F16H 59/72 | (2006.01) |
| F16D 48/06 | (2006.01) |
| F16H 59/40 | (2006.01) |
| F16H 59/42 | (2006.01) |
| F16H 59/14 | (2006.01) |

(52) U.S. Cl.
CPC ............ *F16H 61/12* (2013.01); *F16D 48/06* (2013.01); *F16H 59/40* (2013.01); *F16H 59/42* (2013.01); *F16H 59/72* (2013.01); *F16H 61/02* (2013.01); *F16D 2500/1045* (2013.01); *F16D 2500/1085* (2013.01); *F16D 2500/10412* (2013.01); *F16D 2500/30405* (2013.01); *F16D 2500/30421* (2013.01); *F16H 2059/148* (2013.01); *F16H 2059/725* (2013.01); *F16H 2061/1268* (2013.01)

(58) Field of Classification Search
None
See application file for complete search history.

(56) References Cited

U.S. PATENT DOCUMENTS

| | | | | |
|---|---|---|---|---|
| 6,466,854 B1* | 10/2002 | Henneken | ............ | F16H 59/72 477/65 |
| 8,600,636 B2* | 12/2013 | Chen | ............ | F16D 48/06 192/104 F |
| 8,700,352 B2* | 4/2014 | Hebbale | ............ | F16D 48/06 702/103 |

FOREIGN PATENT DOCUMENTS

JP   2007-263172 A   10/2007

*Primary Examiner* — Dirk Wright
(74) *Attorney, Agent, or Firm* — Drinker Biddle & Reath LLP

(57) ABSTRACT

A control device of an automatic transmission that controls the automatic transmission including a friction engagement element capable of continuously changing a transmission torque includes: a first heat load estimation unit configured to estimate a heat load state in the friction engagement element based on an indication value of the transmission torque; and an estimation stop unit configured to stop the estimation of the heat load state based on a state where the indication value of the transmission torque differs from an actual value of the transmission torque actually transmitted by the friction engagement element.

14 Claims, 4 Drawing Sheets

CONTROL DEVICE OF AUTOMATIC TRANSMISSION AND METHOD OF CONTROLLING AUTOMATIC TRANSMISSION

TECHNICAL FIELD

The present invention relates to a control device of an automatic transmission and a method of controlling an automatic transmission.

BACKGROUND ART

Conventionally, JP2007-263172A discloses a device that calculates an amount of heat generated by a clutch at the time of engagement transition when the clutch is transferred from a disengaged state to an engaged state based on a relative rotation speed difference between an input shaft of the clutch and an output shaft of the clutch and the transmission torque of the clutch. The transmission torque is calculated from the duty value of a solenoid valve for supplying and discharging a hydraulic pressure to the clutch, that is, a hydraulic pressure indicated to the clutch.

SUMMARY OF INVENTION

The supply and discharge of a hydraulic pressure to the clutch of an automatic transmission is performed by controlling a manual valve that is switched by the select position of a shift lever and a solenoid valve that is switched based on a signal from an inhibitor switch which detects the position of the shift lever.

The manual valve is connected to the shift lever through a linkage, and in a case where the shift lever is operated to change a range, when the shift lever is not completely moved to a position after the change, the movement to the position corresponding to the range after the change is not completed.

On the other hand, the solenoid valve is moved based on the signal from the inhibitor switch. Since the detection range (conduction range) of the inhibitor switch is set relatively wide, when the shift lever is operated, before the complete movement of the shift lever to the position after the change, the signal of the inhibitor switch is switched to the signal after the change.

Hence, for example, when the shift lever is slowly moved, though the signal of the inhibitor switch is switched to the signal after the change, the position of the manual valve is the position corresponding to the range before the change, with the result that a hydraulic pressure may not be actually supplied to a clutch which is to be engaged by the operation of the shift lever. As described above, the hydraulic pressure indicated to the clutch and the actual hydraulic pressure which is actually supplied to the clutch may differ from each other.

In such a case, in the invention of patent JP2007-263172A, since the amount of heat generated by the clutch is calculated based on the hydraulic pressure indicated to the clutch, though a hydraulic pressure is not actually supplied to the clutch, and the clutch does not actually generate heat, it is disadvantageously and erroneously determined that the clutch generates heat.

The present invention is made to solve such a problem, and an object of the present invention is to reduce the erroneous determination of a heat load state such as the temperature of a clutch and the amount of heat generated by the clutch when a hydraulic pressure indicated to the clutch and an actual hydraulic pressure differ from each other.

According to an aspect of the present invention, there is provided a control device of an automatic transmission that controls the automatic transmission including a friction engagement element capable of continuously changing a transmission torque, the control device including: a first heat load estimation unit configured to estimate a heat load state in the friction engagement element based on an indication value of the transmission torque; and an estimation stop unit configured to stop the estimation of the heat load state based on a difference state where the indication value of the transmission torque differs from an actual value of the transmission torque actually transmitted by the friction engagement element.

According to another aspect of the present invention, there is provided a method of controlling an automatic transmission that controls the automatic transmission including a friction engagement element capable of continuously changing a transmission torque, the method including: estimating a heat load state in the friction engagement element based on an indication value of the transmission torque; and stopping the estimation of the heat load state based on a difference state where the indication value of the transmission torque differs from an actual value of the transmission torque actually transmitted by the friction engagement element.

According to these aspects, the estimation of the heat load state is stopped based on the state where the indication value of the transmission torque differs from the actual value of the transmission torque, and thus it is possible to reduce the erroneous determination of the heat load state.

BRIEF DESCRIPTION OF DRAWINGS

FIG. 3 is a time chart showing variations in the temperature of the second clutch and the like; and FIG. 4 is a time chart showing variations in the temperature of the second clutch and the like.

DESCRIPTION OF EMBODIMENTS

An embodiment of the present invention will be described below with reference to accompanying drawings.

Figure 1:
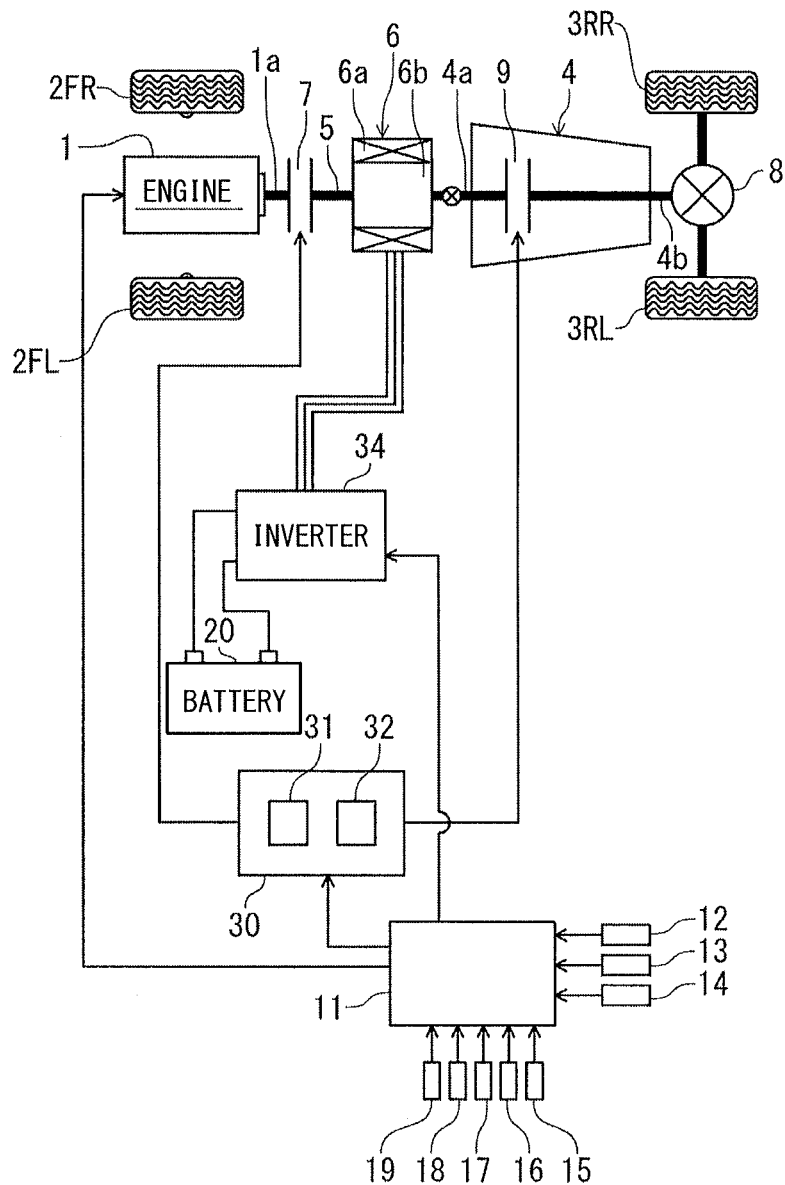
FIG. 1 is a schematic configuration diagram of a hybrid vehicle according to the present embodiment.

FIG. 1 shows the power train of a front engine-rear wheel drive-type hybrid vehicle (electric vehicle) that includes a hybrid drive device incorporating a drive force control device according to an embodiment of the present invention together with its control system.

In the power train of the hybrid vehicle shown in FIG. 1, as in a normal rear wheel-drive vehicle, an automatic transmission 4 is arranged in tandem in the back of an engine 1 in the front/rear direction of the vehicle, and a motor/generator 6 is provided so as to be coupled to a shaft 5 which transmits a rotation from the engine 1 (specifically, a crankshaft 1a) to the input shaft 4a of the automatic transmission.

The motor/generator 6 is formed with an annular stator 6a fixed within a housing and a rotor 6b concentrically arranged so as to have a predetermined air gap within the stator 6a, acts as a motor (electric motor) or acts as a generator (electric generator) according to a requirement for an operation state and is arranged between the engine 1 and the automatic transmission 4. The motor/generator 6 penetrates the shaft 5 described above and adheres to the center of the rotor 6b, and the shaft 5 is utilized as a motor/generator shaft.

Between the motor/generator 6 and the engine 1, specifically, between the motor/generator shaft 5 and the engine crankshaft 1a, a first clutch 7 is inserted, and the engine 1 and the motor/generator 6 are coupled such that they can be separated by the first clutch 7.

The first clutch 7 is designed to be able to continuously change the transmission torque, and is formed with, for example, a wet multi-plate clutch that continuously controls a clutch hydraulic oil flow rate and a clutch hydraulic oil pressure with a proportional solenoid so as to be able to change the transmission torque.

The motor/generator 6 and the automatic transmission 4 are directly coupled to each other by direct coupling between the motor/generator shaft 5 and the transmission input shaft 4a.

For example, the automatic transmission 4 is as follows: in the same one described in the C-9 to C-22 pages of "skyline new car (CV35 type vehicle) reference" published in January 2003 by Nissan Motor Co., Ltd., the torque converter is removed and instead, the motor/generator 6 is directly coupled to the transmission input shaft 4a, a plurality of speed change friction elements (such as a clutch and a brake) are selectively engaged or disengaged and thus a transmission pathway (gear) is determined by combination of the engagement and the disengagement of these speed change friction elements.

Hence, the automatic transmission 4 shifts the rotation from the input shaft 4a in a gear ratio corresponding to the selected gear, and outputs it to an output shaft 4b.

The output rotation of the automatic transmission 4 is distributed and transmitted by a differential gear device 8 to left and right rear wheels 3RL and 3RR, and is used for travel of the vehicle.

However, it is needless to say that the automatic transmission 4 is not limited to the gear-shiftable one described above, and may be a continuously variable transmission including a forward/backward switch mechanism or a starting clutch.

Although in a hybrid vehicle, a second clutch 9 is needed which couples the motor/generator 6 and the drive wheels 3RL and 3RR such that they can be separated, in the present embodiment, the configuration where this second clutch 9 is newly added and provided before or after the automatic transmission 4 is not adopted, and instead, as the second clutch 9, among the speed change friction elements already present within the automatic transmission 4, a speed change friction element for forward gear selection or a speed change friction element for backward gear selection is diverted.

The speed change friction element for forward gear selection or the speed change friction element for backward gear selection already present within the automatic transmission 4, which is used as the second clutch 9, is originally one that can continuously change the transmission torque capacity as with the first clutch 7.

The control device of the automatic transmission 4 is formed with a controller 11 and a hydraulic control unit 30, and the controller 11 also has the functions of controlling the engine 1 and the motor/generator 6. The hydraulic control unit 30 includes a manual valve 31, a solenoid valve 32 that controls the hydraulic pressure to the second clutch 9 and a solenoid valve that controls the hydraulic pressure to an unillustrated friction engagement element.

The manual valve 31 is mechanically coupled to the shift lever, and switches oil passages based on the operation of the shift lever to supply and discharge the hydraulic pressure to the second clutch 9.

The solenoid valve 32 is driven by a torque indication signal calculated by the controller 11 based on signals from an inhibitor switch 19 and other sensors that will be described later, and controls a hydraulic pressure supplied to the second clutch 9 such that the hydraulic pressure is a hydraulic pressure corresponding to the indication torque (hereinafter also referred to as an indication value for the transmission torque or an indication clutch torque).

In the inhibitor switch 19, since as described above, the detection range is set relatively wide, and thus the signal is switched before the completion of the operation of the shift lever, the signal is fed from the controller 11 before the completion of the switching of the hydraulic pressure by the manual valve 31, with the result that the solenoid valve 32 may be operated.

The controller 11 is formed with a CPU, a ROM, a RAM and the like, and reads a program stored in the ROM with the CPU to achieve each function.

The following signals are input to the controller 11: a signal from an engine rotation sensor 12 that detects an engine rotation speed; a signal from a motor/generator rotation sensor 13 that detects a motor/generator rotation speed; a signal from an input rotation sensor 14 that detects a transmission input rotation speed; a signal from an output rotation sensor 15 that detects a transmission output rotation speed; a signal from an acceleration opening sensor 16 that detects an amount of stepping of an acceleration pedal (acceleration opening); a signal from a storage state sensor 17 that detects a storage state (power that can be fed) of a battery 20 which stores power for the motor/generator 6; a signal from an oil temperature sensor 18 that detects the temperature of the oil pan of the automatic transmission 4; and a signal from the inhibitor switch 19 that detects the position of the shift lever.

The controller 11 uses the input information described above, and thereby selects an operation mode (EV mode, HEV mode) and the gear of the automatic transmission 4 that can realize the drive force of the vehicle desired by a driver and calculates a target engine torque and a target motor/generator torque to control the individual devices based on the calculated values.

The controller 11 calculates a first clutch target engagement capacity and a second clutch target engagement capacity based on at least the accelerator opening, calculates the indication torque of the first clutch 7 and the indication torque of the second clutch 9 (the indication values for the transmission torque) based on each target engagement capacity, controls the unillustrated other solenoid valves to control the transmission torque capacity of the first clutch 7 and controls the solenoid valve 32 to control the transmission torque capacity of the second clutch 9.

The controller 11 controls the engine 1 on the basis of the engine rotation speed detected by the engine rotation sensor 12 and the target engine torque by throttle opening control and fuel injection amount control for realizing the target engine torque based on the engine rotation speed such that the engine torque is the target engine torque.

The controller 11 converts the power of the battery 20 with an inverter 34 from direct current to alternating current, and controls the motor/generator 6 such that the motor/generator torque is equal to the target motor/generator torque.

As described above, since in the present embodiment, no torque converter is provided, for example, when the shift lever is operated from a non-travel mode in an N range to a travel mode in a R range, and the vehicle is started to travel, the second clutch 9 is changed from a disengaged state to a slip state to start the vehicle. Here, in the second clutch 9, based on the indication torque calculated by the controller 11, the transmission torque capacity is controlled.

When the second clutch 9 is brought from the disengaged state into the slip state, though the second clutch 9 starts the torque transmission, in this case, a relative rotation speed difference between the input shaft rotation speed and the output shaft rotation speed of the second clutch 9 is produced, the second clutch 9 generates heat according to the relative rotation speed difference and the torque actually transmitted at that time and the temperature of the second clutch 9 is increased. When the temperature of the second clutch 9 is excessively increased, the second clutch 9 is degraded by the high heat. Hence, in the present embodiment, the controller 11 performs temperature estimation control such that when the temperature of the second clutch 9 is equal to or more than an upper limit temperature (upper limit load state) which prevents the second clutch 9 from being degraded, the temperature of the second clutch 9 is decreased to protect the second clutch 9. In this control, to decrease the temperature of the second clutch 9, for example, a warning light is turned on to provide a warning, and the clutch is kept in the disengaged state to prevent the second clutch 9 from being brought into the slip state where the second clutch 9 generates heat or the torque input to the second clutch 9 is reduced.

In the temperature estimation control, the controller 11 multiplies the indication torque of the second clutch 9 by the relative rotation speed difference of the second clutch 9 to calculate the amount of heat generated by the second clutch 9, calculates the increased temperature of the second clutch 9 from the calculated amount of heat generated, adds the increased temperature to the temperature of the second clutch 9 estimated from the previous computation and estimates the current temperature of the second clutch 9. In the temperature estimation control described above, based on the indication torque of the second clutch 9, the amount of heat generated by the second clutch 9 or the heat load state such as the temperature is estimated. The initial temperature of the second clutch 9 is set at the temperature of the oil in the oil pan detected by the oil temperature sensor 18.

Although in the temperature estimation control, based on the indication torque of the second clutch 9, the temperature of the second clutch 9 is estimated, when the indication torque differs from the actual torque (the actual value of the transmission torque) actually transmitted by the second clutch 9, the estimated temperature of the second clutch 9 differs from the actual temperature of the second clutch 9.

As described above, when the signal is fed from the controller 11 to the solenoid valve 32 before the completion of the switching of the manual valve 31, though the supply of the hydraulic pressure to the second clutch 9 is not started, the controller 11 erroneously recognizes that the second clutch is brought into a state where the second clutch starts to be engaged, that is, the second clutch is brought from the disengaged state into the slip state.

In such a case, although the second clutch 9 is disengaged, the second clutch 9 does not generate heat and the actual temperature of the second clutch 9 is not increased, since the indication torque of the second clutch 9 is increased, the temperature of the second clutch 9 estimated by the temperature estimation control is increased, with the result that the estimated temperature of the second clutch 9 differs from the actual temperature of the second clutch 9. Even if the actual temperature of the second clutch 9 is lower than the upper limit temperature, when the estimated temperature of the second clutch 9 is equal to or more than the upper limit temperature, the above-described control for decreasing the temperature of the clutch is performed.

Hence, in the present embodiment, when the temperature estimation control is performed, in order to prevent the temperature of the second clutch 9 from being erroneously determined, temperature estimation stop control is performed.

Figure 2:
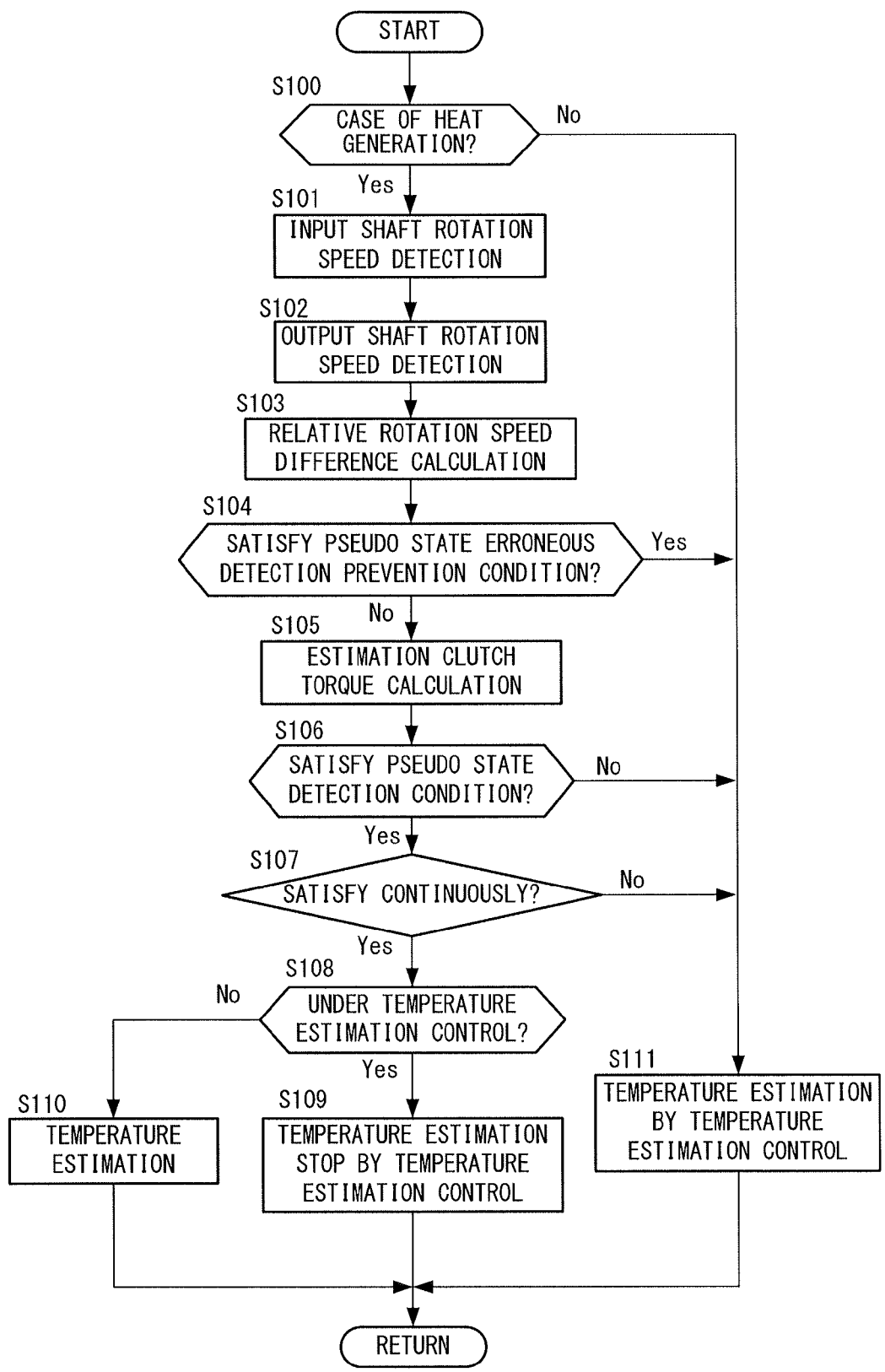
FIG. 2 is a flowchart illustrating temperature estimation stop control on a second clutch.

The temperature estimation stop control in the present embodiment will be described with reference to a flowchart shown in FIG. 2.

In the step S100, the controller 11 determines whether or not the second clutch 9 generates heat. Specifically, the controller 11 determines whether or not the second clutch 9 is in the slip state. For example, when the shift lever is changed from the N range to the R range, and a signal in the R range is output from the inhibitor switch 19, the controller 11 determines that the second clutch 9 is in the slip state, that is, the second clutch 9 generates heat. When the controller 11 determines that the second clutch 9 generates heat, the process proceeds to the step S101 whereas when the controller 11 determines that the second clutch 9 does not generate heat, the process proceeds to the step S111.

In the step S101, the controller 11 detects the input shaft rotation speed of the second clutch 9 based on the signal from the input rotation sensor 14.

In the step S102, the controller 11 detects the output shaft rotation speed of the second clutch 9 based on the signal from the output rotation sensor 15.

In the step S103, the controller 11 calculates a deviation between the input shaft rotation speed of the second clutch 9 and the output shaft rotation speed of the second clutch 9 to calculate the relative rotation speed difference.

In the step S104, the controller 11 determines whether or not pseudo state erroneous detection prevention condition is satisfied. Specifically, the controller 11 determines whether or not a condition (a) or a condition (b) indicated below is satisfied. The pseudo state refers to a state where the state of the second clutch 9 on the control differs from the actual state of the second clutch 9, and for example, the pseudo state is a state where although the signal of the inhibitor switch 19 is a signal corresponding to the R range, and on the control, the second clutch 9 is in the engaged state or the slip state, the hydraulic pressure is not actually supplied to the second clutch 9, and the second clutch 9 is in the disengaged state.

(a) The relative rotation speed difference is lower than the upper limit rotation speed (second predetermined rotation speed).

(b) The accelerator opening is lower than a predetermined opening.

The upper limit rotation speed is set at a rotation speed at which it is possible to estimate that during the time in which the second clutch 9 can be brought into the pseudo state and which is determined previously by an experiment with consideration given to a predetermined safety rate, even if the temperature estimation on the second clutch 9 based on the indication torque is continued with in a state where the indication torque of the second clutch 9 differs from the actual torque of the second clutch 9, the temperature of the second clutch 9 is prevented from being estimated to be equal to or more than the upper limit temperature.

The predetermined opening is set at a predetermined opening for the indication torque at which it is possible to estimate that during the time in which the second clutch 9 can be brought into the pseudo state and which is determined previously by an experiment with consideration given to a predetermined safety rate, even if the temperature estimation on the second clutch 9 based on the indication torque is continued in the state where the indication torque of the second clutch 9 differs from the actual torque of the second clutch 9, the temperature of the second clutch 9 is prevented from being estimated to be equal to or more than the upper limit temperature.

When the relative rotation speed difference is lower than the upper limit rotation speed or the accelerator opening is lower than the predetermined opening, even if the temperature estimation on the second clutch 9 based on the indication torque is continued in the state where the indication torque of the second clutch 9 differs from the actual torque of the second clutch 9, the temperature of the second clutch 9 is prevented from being estimated to be equal to or more than the upper limit temperature. Hence, when either of the conditions (a) and (b) is satisfied, the controller 11 proceeds to the step S111 whereas when neither the conditions (a) nor (b) is satisfied, the controller 11 proceeds to the step S105.

In the step S105, the controller 11 estimates the torque that is actually transmitted by the second clutch 9. This estimation clutch torque (the estimated value of the transmission torque) is calculated based on formula (1).

$$\text{estimation clutch torque} = \text{input torque} - \text{inertia torque} - \text{friction} + \text{other variations} \quad (1)$$

The input torque is a total value of the engine torque and the motor/generator torque, and is a torque that is input to the input shaft of the second clutch 9. In the present embodiment, the first clutch 7 is assumed to be engaged. The inertia torque is calculated by multiplying together a previously determined inertia and the amount of variation in the rotation speed per unit time of the input shaft of the second clutch 9. The inertia torque is a value that differs depending on the engaged state of the first clutch 7. The friction is the friction of the automatic transmission 4, is a constant per rotation speed of the input shaft of the second clutch 9 and is calculated based on a map determined previously with an experiment or the like. The other variations are values determined previously with an experiment or the like.

As indicated in formula (1), the estimation clutch torque is calculated based on a mechanism in which a torque other than the torque transmitted by the second clutch 9 in the input torque is consumed by the increase in the rotation speed of the input shaft and the friction. The estimation clutch torque is decreased when the inertia torque is high or when the input torque is low. The inertia torque is increased when the amount of variation of the rotation speed per unit time of the input shaft of the second clutch 9 is increased. The input torque is decreased when the degree to which the accelerator pedal is stepped on is low or when rotation number control is performed.

The rotation number control is a control in which in order for the raising of the engine rotation speed to be reduced, a negative motor torque for the engine torque is generated by the motor/generator 6. When the rotation number control is performed, the rotation speed of the input shaft is kept substantially constant and variations in the input torque of the second clutch 9 are reduced.

In the step S106, the controller 11 determines whether or not a pseudo state detection condition is satisfied. Specifically, the controller 11 determines conditions (c) and (d) indicated below.

(c) The deviation between the indication clutch torque and the estimation clutch torque is higher than a predetermined value.

(d) The relative rotation speed difference is higher than a predetermined rotation speed (first predetermined rotation speed).

The predetermined value is such a value as to be erroneously determined that although the indication torque to the second clutch 9 differs from the actual torque actually transmitted by the second clutch 9, the amount of heat generated by the second clutch 9 is actually low and the temperature of the second clutch 9 is not high, in the temperature estimation control, the temperature of the second clutch 9 calculated based on the indication torque is high, and the temperature of the second clutch 9 is high.

The predetermined rotation speed is a value that is obtained by adding a predetermined margin to an idle rotation speed when the shift lever is in the N range. The predetermined rotation speed is higher than the upper limit rotation speed.

When the deviation between the indication clutch torque and the estimation clutch torque is higher than the predetermined value or when the relative rotation speed difference is higher than the predetermined rotation speed, the state can be regarded as the pseudo state described above.

When either of the conditions (c) and (d) is satisfied, the controller 11 determines that the pseudo state detection condition is satisfied, and proceeds to the step S107 whereas when neither the conditions (c) nor (d) is satisfied, the controller 11 determines that the pseudo state detection condition is not satisfied, and proceeds to the step S111.

In the step S107, the controller 11 determines whether or not the pseudo state detection condition is continuously satisfied for a predetermined time. When the pseudo state detection condition is continuously satisfied for the predetermined time, the controller 11 proceeds to the step S108 whereas when the pseudo state detection condition is not continuously satisfied for the predetermined time, the controller 11 proceeds to the step S111. The predetermined time is such a time that it is possible to reliably determine that the state is the pseudo state, and is previously set.

In the step S108, the controller 11 determines whether or not the temperature estimation control based on the indication torque is performed. When the temperature estimation control based on the indication torque is performed, the controller 11 proceeds to the step 109 whereas when the temperature estimation control based on the indication torque is not performed, the controller 11 proceeds to the step S110.

In the step S109, the controller 11 stops the temperature estimation control based on the indication torque, detects the temperature of the oil in the oil pan with the oil temperature sensor 18 and estimates that the temperature of the second clutch 9 is equal to the temperature of the oil in the oil pan.

In the step S110, the controller 11 estimates that the second clutch 9 discharges heat, and subtracts a previously set value from the temperature of the second clutch 9 estimated by the previous control to estimate the current temperature of the second clutch 9. The temperature estimation here is performed with the assumption that the temperature of the oil pan is the lower limit value. In the step S109, the temperature of the second clutch 9 is estimated to be the temperature of the oil pan, and here, the temperature of the second clutch 9 is estimated to be the temperature of the oil pan.

In the step S111, the controller 11 performs the temperature estimation control on the second clutch 9 based on the indication torque.

Variations in the temperature of the second clutch 9 in the present embodiment and the like will then be described with reference to the time charts of FIGS. 3 and 4.

In the hybrid automobile of the present embodiment, it is possible to perform the rotation number control described above. Here, variations in the temperature of the second clutch 9 and the like will be described separately for each of the case where the rotation number control is performed and the case where the rotation number control is not performed.

Figure 3:
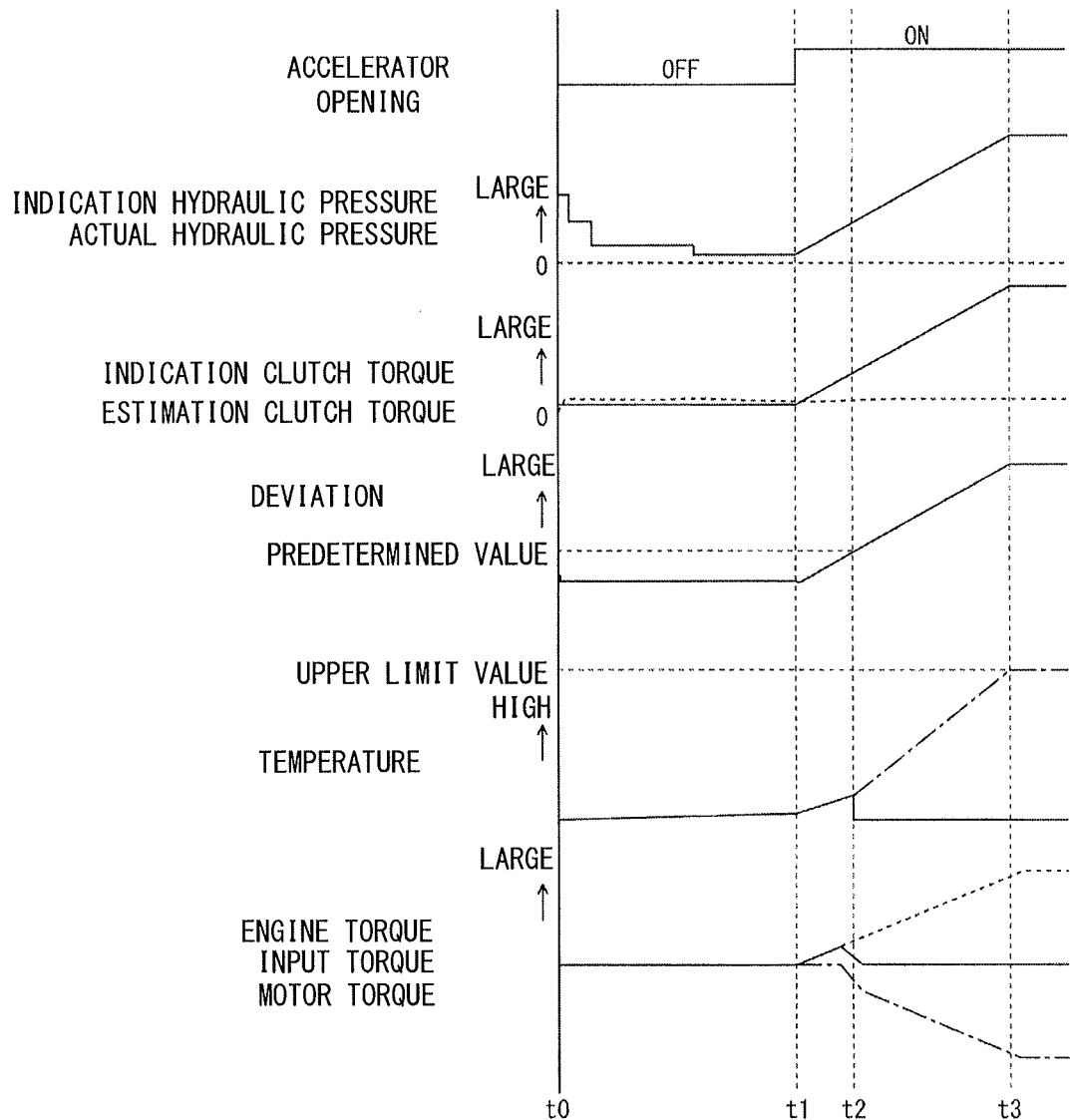

FIG. 3 is a time chart in the case where the rotation number control is performed. FIG. 4 is a time chart in the case where the rotation number control is not performed. A description will first be given with reference to FIG. 3.

At the time t0, the change of the shift lever from the N range to the R range is started. Here, it is assumed that the shift lever is slowly operated. When the shift lever is changed, the signal from the inhibitor switch 19 is changed to a signal corresponding to the R range, and an indication hydraulic pressure of the second clutch 9 (in FIG. 3, a solid line) based on the indication clutch torque is output. However, the manual valve 31 is in a position corresponding to the N range, the hydraulic pressure is not actually supplied to the second clutch 9, the actual hydraulic pressure (in FIG. 3, a broken line) actually supplied to the second clutch 9 is zero and the second clutch 9 is disengaged.

Here, since the accelerator pedal is not stepped on, in order for the backlash of the second clutch 9 to be filled, the hydraulic pressure of the second clutch 9 (in FIG. 3, the solid line) indicated to the second clutch 9 is temporarily increased, and is then maintained to be a constant value. Since the accelerator pedal is not stepped on, the input torque and the inertia torque are constant. Hence, the estimation clutch torque (in FIG. 3, a broken line) is maintained to be substantially constant value. Thus, the deviation between the indication clutch torque and the estimation clutch torque is substantially constant. The temperature of the second clutch 9 estimated by the temperature estimation control is also substantially constant.

When at the time t1, the accelerator pedal is stepped on, the engine torque (in FIG. 3, a broken line) is increased, and although since the second clutch 9 is in the disengaged state, the engine rotation speed attempts to be raised, the rotation number control is performed here, and thus a negative motor torque (in FIG. 3, a dashed line) is generated by the motor/generator 6 to reduce the raising of the engine rotation speed and the increase in the input torque (in FIG. 3, a solid line) of the second clutch 9. Since the rotation speed of the input shaft of the second clutch 9 is kept substantially constant, the inertial torque remains substantially constant. Hence, the estimation clutch torque calculated by formula (1) remains substantially constant. However, since the indication clutch torque is increased according to the degree to which the accelerator pedal is stepped on, the deviation between the indication clutch torque and the estimation clutch torque is increased. Although the second clutch 9 is in the disengaged state, and does not generate heat, the temperature of the second clutch 9 estimated based on the indication torque is increased.

When at the time t2, the deviation between the indication clutch torque and the estimation clutch torque is higher than the predetermined value, the temperature estimation control based on the indication torque is stopped and the temperature of the second clutch 9 is estimated to be the same as that of the oil pan, with the result that the estimated temperature of the second clutch 9 is lowered. After the time t2, while the temperature estimation control based on the indication torque is stopped, it is estimated that the second clutch 9 discharges heat.

When the present embodiment is not used, though the temperature estimation control based on the indication torque is not stopped, and the second clutch 9 is actually disengaged and does not generate heat, the temperature of the second clutch 9 estimated by the temperature estimation control based on the indication torque is increased. In FIG. 3, the temperature of the second clutch 9 estimated when the present embodiment is not used is indicated by a dotted line. When at the time t3, the estimated temperature of the second clutch 9 reaches the upper limit value, control which is originally unnecessary and in which the temperature of the clutch is decreased is performed. As described above, when the present embodiment is not used, though the temperature of the second clutch 9 is not high, the control in which the temperature of the clutch is decreased is performed.

Figure 4:
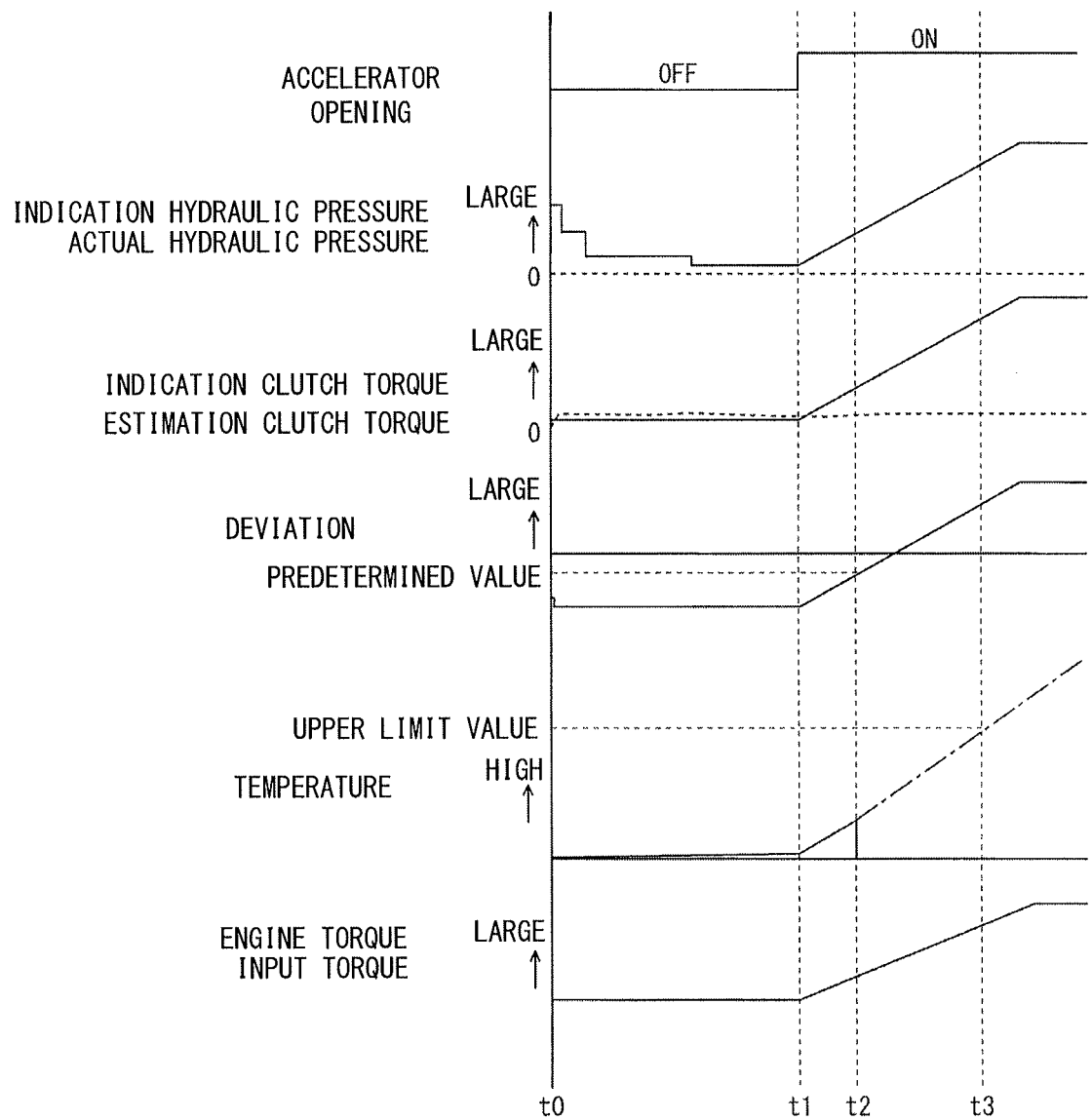

A description will then be given with reference to FIG. 4.

Variations at the time t0 are the same as in the case described with reference to FIG. 3.

When at the time t1, the accelerator pedal is stepped on, since the engine torque is increased, the second clutch 9 is in the disengaged state and the rotation number control is not performed, the engine rotation speed is raided. Hence, the input torque of the input shaft of the second clutch 9 is increased, the rotation speed of the input shaft of the second clutch 9 is increased and the inertia torque is increased. Since in formula (1), the input torque is increased, and the inertia torque is also increased, the estimation clutch torque is not significantly changed. However, since the indication torque is increased according to the accelerator opening, and the indication clutch torque is also increased, the deviation between the indication clutch torque and the estimation clutch torque is increased. Although the second clutch 9 is in the disengaged state, and does not generate heat, the temperature of the second clutch 9 estimated based on the indication torque is increased.

When at the time t2, the deviation between the indication clutch torque and the estimation clutch torque is higher than the predetermined value, since the temperature estimation control based on the indication torque is stopped, and the temperature of the second clutch 9 is estimated to be the same as that of the oil pan, the estimated temperature of the second clutch 9 is lowered. After the time t2, while the temperature estimation control based on the indication torque is stopped, it is estimated that the second clutch 9 discharges heat.

When the present embodiment is not used, as in the case shown in FIG. 3, the temperature of the second clutch 9 estimated based on the indication torque is increased. However, here, since the relative rotation speed difference is increased by the raising of the engine rotation speed, the estimated temperature rise of the second clutch 9 is more quickly achieved as compared with the case shown in FIG. 3, and the estimated temperature of the second clutch 9 quickly reaches the upper limit value, with the result that the control which is originally unnecessary and in which the temperature of the clutch is decreased is performed.

The effects of the embodiment of the present invention will be described.

When the temperature estimation control in which the temperature of the second clutch 9 is estimated based on the indication torque of the second clutch 9 is performed, and the indication torque of the second clutch 9 differs from the actual torque of the second clutch 9, the temperature estimation which is performed by the temperature estimation control and which is based on the indication torque of the second clutch 9 is stopped. In this way, it is possible to prevent an erroneous determination, which is caused by being continued the temperature estimation based on the indication torque although the indication torque of the second clutch 9 differs from the actual torque, of the temperature of the second clutch 9. For example, it is possible to prevent the temperature of the second clutch 9 from being estimated to be high although the temperature of the second clutch 9 is not actually high and to prevent the execution of the originally unnecessary control in which the temperature of the clutch is lowered.

In the temperature estimation control of the present embodiment, the estimation clutch torque of the second clutch 9 is not used, the indication torque of the second clutch 9 is used and thus the temperature of the second clutch 9 is calculated. This is because the calculation accuracy is better in the calculation using the indication torque than in the calculation using the estimation clutch torque. In the estimation clutch torque, since the temperature is determined by calculation, for example, effects resulting from variations in the second clutch 9 such as the magnitude of friction and external disturbance are received, with the result that the accuracy is degraded. In the indication torque, it is possible to perform such learning control that errors caused by variations are removed and the indication torque is equal to the actual torque, with the result that the accuracy is good. As described above, the indication torque is used to estimate the temperature of the second clutch 9, and thus it is possible to accurately estimate the temperature of the second clutch 9. Furthermore, whether or not the actual torque corresponding to the indication torque is achieved is determined based on the estimation clutch torque, and thus it is possible to reduce the degradation of the temperature estimation on the second clutch 9 based on the indication torque.

In the present embodiment, based on the deviation between the input torque of the input shaft of the second clutch 9 and the inertia torque of the input shaft of the second clutch 9, the estimation clutch torque is calculated, and when the difference between the indication clutch torque and the estimation clutch torque is higher than the predetermined value, the temperature estimation on the second clutch 9 which is performed by the temperature estimation control and which is based on the indication torque of the second clutch 9 is stopped. In this way, even if the rotation number control is performed, the engine rotation speed is not raised and it is impossible to determine, from the raising of the engine rotation speed, whether the second clutch 9 is in the disengaged state, it is possible to determine that the indication torque of the second clutch 9 differs from the actual torque of the second clutch 9, with the result that it is possible to accurately perform the temperature estimation on the second clutch 9.

For example, with respect to the logic in which based on the raising of the engine rotation speed or a rapid increase in the relative rotational speed of the second clutch 9 caused by the raising of the engine rotation speed, whether the indication torque of the second clutch 9 differs from the actual torque (the second clutch 9 is in the disengaged state) is determined, when the rotation number control is performed, since the engine rotation speed is not raised, though the indication torque of the second clutch 9 actually differs from the actual torque, it is impossible to determine that they differ from each other (they are in the disengaged state), with the result that it is erroneously determined that the second clutch 9 transmits the torque. Hence, when in this state, the temperature estimation based on the indication torque is continued, the temperature of the second clutch 9 is estimated to be high, and thus the originally unnecessary control in which the temperature of the clutch is lowered is performed. In the present embodiment, as described above, even if it is impossible to accurately determine, based on the engine rotation speed, whether the indication torque of the second clutch 9 differs from the actual torque, it is possible to accurately estimate the temperature of the second clutch 9, with the result that it is possible to prevent the execution of the originally unnecessary control in which the temperature of the clutch is lowered.

In the temperature estimation control of the present embodiment, when the relative rotation speed difference of the second clutch 9 is higher than the predetermined rotation speed, the temperature estimation on the second clutch 9 performed by the temperature estimation control is stopped. If the driver steps on the accelerator when the hydraulic pressure is not actually supplied to the second clutch 9, and thus the relative rotation speed difference of the second clutch 9 is increased (the engine rotation is raided), and thus, when the relative rotation speed difference is higher than the predetermined rotation speed, it is possible to determine that the indication torque and the actual torque differ from each other. Not only the determination of whether the indication torque and the actual torque differ from each other based on the estimation clutch torque but also the determination based on the relative rotation speed difference is performed, and thus it is possible to further accurately determine whether the indication torque and the actual torque differ from each other. Hence, it is possible to accurately estimate the temperature of the second clutch 9, and thus it is possible to prevent the execution of the originally unnecessary control in which the temperature of the clutch is lowered.

In the present embodiment, when the amount of heat generated by the second clutch 9 is low even if the second clutch 9 transmits the torque, such as when the relative rotation speed difference is lower than the upper limit rotation speed or when the accelerator opening is lower than the predetermined opening, the temperature estimation based on the indication torque of the second clutch 9 is not stopped, and the temperature of the second clutch 9 is estimated by the temperature estimation control. When the amount of heat generated is low, even if in the disengaged state where the second clutch 9 does not transmit the torque, the temperature estimation based on the indication torque of the second clutch 9 is continued, it is not estimated that the second clutch has such a high heat as to degrade itself, and thus the temperature estimation control based on the indication torque is not stopped, and the temperature of the second clutch 9 is estimated by the temperature estimation control. Hence, it is possible to reduce the erroneous stop of the temperature estimation based on the indication torque caused by erroneously determining the conditions (c) and (d) described above, with the result that it is possible to appropriately stop the temperature estimation control.

In the present embodiment, when the temperature estimation control based on the indication torque is stopped, the temperature of the second clutch 9 is estimated to be the same as that of the oil pan. In this way, when the pseudo state of the second clutch 9 is removed, and the temperature estimation control based on the indication torque is restarted, it is possible to prevent the temperature of the second clutch 9 from being estimated to be higher than the actual temperature and to prevent the execution of the originally unnecessary control in which the temperature of the clutch is lowered.

In the present embodiment, the temperature estimation control is stopped, the temperature of the second clutch 9 is estimated to be the same as that of the oil pan, thereafter during the time in which the temperature estimation based on the indication torque is stopped, the temperature of the oil in the oil pan is assumed to be the lower limit value, the second clutch 9 is regarded as discharging heat and the temperature of the second clutch 9 is estimated. In this way, when the pseudo state of the second clutch 9 is removed, and the temperature estimation control based on the indication torque is restarted, it is possible to prevent the temperature of the second clutch 9 from being estimated to be higher than the actual temperature, and to prevent the execution of the originally unnecessary control in which the temperature of the clutch is lowered.

Although the embodiment of the present invention has been described above, the embodiment described above is simply part of the application of the present invention, and the technical scope of the present invention is not intended to be limited to the specific configuration of the embodiment described above.

Although in the embodiment described above, when the temperature estimation control based on the indication torque is stopped, the temperature of the second clutch 9 is estimated to be the same as that of the oil in the oil pan, the temperature of the second clutch 9 may be estimated to be the same as that of the second clutch 9 when the shift lever is operated. For example, when the shift lever is changed from the N range to the R range, and the second clutch 9 is switched from the disengaged state to the engaged state, the temperature of the second clutch 9 is estimated to be the same as that of the second clutch 9 when the signal of the inhibitor switch 19 is changed to the R range. In this way, when the pseudo state of the second clutch 9 is removed, and the temperature estimation control based on the indication torque is restarted, it is possible to reduce the execution of the originally unnecessary control in which the temperature of the clutch is lowered and to easily perform control for protecting the second clutch 9 as compared with the case where the temperature of the second clutch 9 is estimated to be the same as that of the oil in the oil pan, with the result that it is possible to safely control the second clutch 9.

When the temperature estimation control based on the indication torque is stopped, the temperature of the second clutch 9 may be estimated to be the same as the temperature when the temperature estimation control based on the indication torque is stopped. In this way, for example, as compared with the case where the temperature of the second clutch 9 is estimated to be the same as that of the oil in the oil pan, when the pseudo state of the second clutch 9 is removed, and the temperature estimation control based on the indication torque is restarted, it is possible to easily perform control for protecting the second clutch 9, with the result that it is possible to safely control the second clutch 9.

Although in the embodiment described above, during the time in which the temperature estimation control based on the indication torque is stopped, the temperature of the oil pan is assumed to be the lower limit value, the second clutch 9 is estimated to discharge heat, a previously set value is subtracted from the temperature of the second clutch 9 estimated by the previous control and thus the current temperature of the second clutch 9 is estimated, the temperature of the second clutch 9 may be estimated by estimating that the temperature when the temperature estimation control based on the indication torque is stopped is maintained. In this way, when the pseudo state of the second clutch 9 is removed, and the temperature estimation control based on the indication torque is restarted, it is possible to reduce the execution of the originally unnecessary control in which the temperature of the clutch is lowered and to easily perform control for protecting the second clutch 9 as compared with the case where heat is estimated to be discharged, with the result that it is possible to safely control the second clutch 9.

During the time in which the temperature estimation control based on the indication torque is stopped, the temperature estimation on the second clutch 9 may be performed based on the estimation clutch torque of the second clutch 9. In this way, as compared with the case where the second clutch 9 is estimated to discharge heat, when the pseudo state of the second clutch 9 is removed, and the temperature estimation control based on the indication torque is restarted, it is possible to easily perform control for protecting the second clutch 9, with the result that it is possible to safely control the second clutch 9.

The temperature estimation when the temperature estimation control is stopped and the temperature estimation after the temperature estimation control based on the indication torque of the second clutch 9 is stopped can be performed by combining the embodiment described above with the variation described above.

Although in the embodiment described above, as the case where the second clutch 9 discharges heat, a description has been given using, an example, the case where the shift lever is changed from the N range to the R range, there may be a case where the friction engagement element such as the clutch is brought into the slip state to generate heat, such as a case where the clutch is switched by a speed change.

Although in the embodiment described above, the case where the first clutch 7 between the engine 1 and the motor/generator 6 is engaged has been described, the above control may be performed when the first clutch 7 is disengaged or in the slip state.

Although in the embodiment described above, the case where the shift lever is operated to produce the pseudo state in which the signal from the inhibitor switch 19 does not match with the position of the manual valve 31 and thus the indication torque of the second clutch 9 differs from the actual torque has been described, the above control may be performed when for example, at the time of very low temperature, the temperature of the oil is lowered to make the response of the hydraulic pressure slow and thus the indication torque of the second clutch 9 differs from the actual torque. In this case, when the temperature of the oil is equal to or less than a predetermined temperature of the oil at which the response of the hydraulic pressure is slow, it may be determined that the indication torque of the second clutch 9 differs from the actual torque. The above control may be performed when a failure caused by a valve stick or the like occurs to make the indication torque of the second clutch 9 differ from the actual torque.

Although in the embodiment described above, the case where the temperature of the second clutch 9 is estimated based on the indication torque of the second clutch 9 and the relative rotation speed difference of the second clutch 9 has been described, there is no restriction on this case, and the temperature of the second clutch 9 is preferably estimated based on at least the indication torque of the second clutch 9.

Although in the embodiment described above, the deviation between the indication clutch torque of the second clutch 9 and the estimation clutch torque is compared with the predetermined value, the absolute value of the deviation between the indication clutch torque of the second clutch 9 and the estimation clutch torque may be compared with the predetermined value. In this way, even if a difference is made such that the indication clutch torque of the second clutch 9 is lower than the estimation clutch torque, it is possible to reduce the erroneous detection.

Although in the embodiment described above, when as the pseudo state erroneous detection prevention condition, either of the conditions (a) and (b) is satisfied, the temperature estimation by the temperature estimation control is performed, when both the conditions (a) and (b) are satisfied, the process may proceed to the step S111 where the temperature estimation by the temperature estimation control is performed whereas when either of the conditions (a) and (b) is not satisfied, the process may proceed to the step S105.

This application claims priority based on Japanese Unexamined Patent Application Publication No. 2012-191536 filed on Aug. 31, 2012 with Japan Patent office, the entire content of which is incorporated herein by reference.

The invention claimed is:
1. A control device of an automatic transmission that controls the automatic transmission including a friction engage- ment element capable of continuously changing a transmission torque, the control device comprising:
- a first heat load estimation unit configured to estimate a heat load state in the friction engagement element based on an indication value of the transmission torque; and
- an estimation stop unit configured to stop the estimation of the heat load state based on a difference state where the indication value of the transmission torque differs from an actual value of the transmission torque actually transmitted by the friction engagement element.

2. The control device of the automatic transmission according to claim 1, the control device further comprising:
- a first rotation speed detection unit configured to detect a rotation speed of an input shaft of the friction engagement element; and
- a torque calculation unit configured to calculate an estimation value of the transmission torque based on a difference between a torque input to the input shaft and an inertia torque of the input shaft based on an amount of variation in the rotation speed of the input shaft per unit time,
- wherein the estimation stop unit is configured to stop the estimation of the heat load state by the first heat load estimation unit when a difference between the indication value of the transmission torque and the estimation value of the transmission torque is more than a predetermined value.

3. The control device of the automatic transmission according to claim 1, the control device further comprising:
- a first rotation speed detection unit configured to detect a rotation speed of an input shaft of the friction engagement element; and
- a second rotation speed detection unit configured to detect a rotation speed of an output shaft of the friction engagement element,
- wherein the estimation stop unit is configured to stop the estimation of the heat load state when a rotation speed difference between the input shaft and the output shaft is more than a first predetermined rotation speed.

4. The control device of the automatic transmission according to claim 1,
- wherein the estimation stop unit is configured not to stop the estimation of the heat load state when an amount of heat generated by the friction engagement element is less than a predetermined amount of heat generated.

5. The control device of the automatic transmission according to claim 4, the control device further comprising:
- a first rotation speed detection unit configured to detect a rotation speed of an input shaft of the friction engagement element; and
- a second rotation speed detection unit configured to detect a rotation speed of an output shaft of the friction engagement element,
- wherein the estimation stop unit is configured not to stop the estimation of the heat load state when a rotation speed difference between the input shaft and the output shaft is less than a second predetermined rotation speed.

6. The control device of the automatic transmission according to claim 4, the control device further comprising:
- an accelerator opening detection unit configured to detect an accelerator opening,
- wherein the estimation stop unit is not configured to stop the estimation of the heat load state when the accelerator opening is less than a predetermined opening.

7. The control device of the automatic transmission according to claim 1, the control device further comprising:
- an oil temperature detection unit configured to detect a temperature of an oil in an oil pan of the automatic transmission; and
- a second heat load estimation unit configured to estimate, when the estimation of the heat load state is stopped by the estimation stop unit, that the heat load state at a time of the stop of the estimation is a same state as the temperature of the oil in the oil pan.

8. The control device of the automatic transmission according to claim 1, the control device further comprising:
- a second heat load estimation unit configured to estimate, when the estimation of the heat load state is stopped by the estimation stop unit, that the heat load state at a time of the stop of the estimation is a same state as the heat load state of the friction engagement element at a time of switching of the friction engagement element from a disengaged state to an engaged state.

9. The control device of the automatic transmission according to claim 1, the control device further comprising:
- a second heat load estimation unit configured to estimate, when the estimation of the heat load state is stopped by the estimation stop unit, that the heat load state at a time of the stop of the estimation is a same state as the heat load state estimated at the time of the stop of the estimation by the first heat load estimation unit.

10. The control device of the automatic transmission according to claim 7, the control device further comprising:
- a third heat load estimation unit configured to regard, when the estimation of the heat load state by the first heat load estimation unit is stopped by the estimation stop unit, the friction engagement element as discharging heat, assume that a heat load state corresponding to the temperature of the oil in the oil pan is a lower limit, and estimate the heat load state.

11. The control device of the automatic transmission according to claim 7, the control device further comprising:
- a third heat load estimation unit configured to estimate, when the estimation of the heat load state by the first heat load estimation unit is stopped by the estimation stop unit, that the heat load state estimated by the second heat load estimation unit is maintained.

12. The control device of the automatic transmission according to claim 7, the control device further comprising:
- a first rotation speed detection unit configured to detect a rotation speed of an input shaft of the friction engagement element;
- a torque calculation unit configured to calculate an estimation value of the transmission torque based on a difference between a torque input to the input shaft and an inertia torque of the input shaft based on an amount of variation in the rotation speed of the input shaft per unit time; and
- a third heat load estimation unit configured to estimate, when the estimation of the heat load state by the first heat load estimation unit is stopped by the estimation stop unit, the heat load state based on the estimation value of the transmission torque.

13. A method of controlling an automatic transmission that controls the automatic transmission including a friction engagement element capable of continuously changing a transmission torque, the method comprising:
- estimating a heat load state in the friction engagement element based on an indication value of the transmission torque; and
- stopping the estimation of the heat load state based on a difference state where the indication value of the transmission torque differs from an actual value of the transmission torque actually transmitted by the friction engagement element.

14. A control device of an automatic transmission that controls the automatic transmission including a friction engagement element capable of continuously changing a transmission torque, the control device comprising:
   first heat load estimation means for estimating a heat load state in the friction engagement element based on an indication value of the transmission torque; and
   estimation stop means for stopping the estimation of the heat load state based on a state where the indication value of the transmission torque differs from an actual value of the transmission torque actually transmitted by the friction engagement element.

* * * * *